US009607537B2

(12) United States Patent
Fleck et al.

(10) Patent No.: US 9,607,537 B2
(45) Date of Patent: Mar. 28, 2017

(54) DISPLAY REGION REFRESH

(75) Inventors: Rod G. Fleck, Bellevue, WA (US); Derek Leslie Knee, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 12/978,141

(22) Filed: Dec. 23, 2010

(65) Prior Publication Data

US 2012/0162238 A1 Jun. 28, 2012

(51) Int. Cl.

| | |
|---|---|
| ***G06F 1/00*** | (2006.01) |
| ***G09G 3/20*** | (2006.01) |
| *G09G 3/34* | (2006.01) |

(52) U.S. Cl.

CPC ............. *G09G 3/20* (2013.01); *G09G 3/3433* (2013.01); *G09G 2320/103* (2013.01); *G09G 2330/021* (2013.01); *G09G 2340/0435* (2013.01)

(58) Field of Classification Search

CPC ........ G09G 2340/0435; G07F 17/3293; G07F 17/3232; G07F 17/322; G06F 1/206; G06F 1/3203

USPC .................................. 345/545, 589; 382/108

See application file for complete search history.

(56) References Cited

U.S. PATENT DOCUMENTS 6,456,334 B1 * 9/2002 Duhault ........................ 348/565
6,469,744 B1 * 10/2002 Pearlstein ..................... 348/554
6,603,444 B1 * 8/2003 Kawanami et al. ............ 345/32
2001/0017611 A1 8/2001 Moriyama
2004/0233219 A1 * 11/2004 Aguera y Arcas ... G06F 3/0481 345/606
2005/0057552 A1 3/2005 Foo et al.
2008/0072163 A1 3/2008 Teng et al.
2008/0100598 A1 5/2008 Juenger (Continued)

FOREIGN PATENT DOCUMENTS

CN 101310320 11/2008
CN 101419779 4/2009

(Continued)

OTHER PUBLICATIONS

"Screen tearing", Retrieved at << http://en.wikipedia.org/wiki/Screen_tearing>>, Oct. 2009, pp. 2.

(Continued)

*Primary Examiner* — Yingchun He
*Assistant Examiner* — Whitney Pointe

(57) ABSTRACT

In embodiments of display region refresh, a display panel has addressable display regions that display at different display refresh rates. Display data is buffered to update the addressable display regions, and subsequent display data is received to further update the addressable display regions. A display controller can determine display update deltas that indicate pending display updates based on a comparison of the display data to the subsequent display data. A first addressable display region can then be refreshed at display refresh rate based on a first display update delta that corresponds to the first addressable display region, and a second addressable display region can be refreshed at a different display refresh rate based on a second display update delta that corresponds to the second addressable display region.

20 Claims, 5 Drawing Sheets

(56) References Cited

U.S. PATENT DOCUMENTS

| | | | | |
|---|---|---|---|---|
| 2008/0278434 | A1 | 11/2008 | Van Dijk et al. | |
| 2009/0109159 | A1 | 4/2009 | Tsai | |
| 2010/0177026 | A1 | 7/2010 | Van Dijk et al. | |
| 2010/0231800 | A1* | 9/2010 | White et al. | 348/663 |
| 2010/0265168 | A1* | 10/2010 | Neugebauer | G09G 3/3614 345/87 |
| 2010/0295878 | A1 | 11/2010 | Mathea et al. | |
| 2011/0074800 | A1* | 3/2011 | Stevens et al. | 345/545 |
| 2011/0157203 | A1* | 6/2011 | Tsai et al. | 345/581 |
| 2012/0218191 | A1* | 8/2012 | Huang | G06F 1/1643 345/173 |

FOREIGN PATENT DOCUMENTS

| | | | |
|---|---|---|---|
| EP | 0655725 | | 5/1995 |
| EP | 1640954 | | 3/2006 |
| JP | 07287207 | | 10/1995 |
| JP | 2007214659 | A | 8/2007 |
| WO | WO-2008088892 | | 7/2008 |
| WO | 2010012831 | A1 | 2/2010 |
| WO | WO-2010012831 | | 2/2010 |

OTHER PUBLICATIONS

"What is e-paper", Retrieved at << http://www.thocp.net/reference/technology/e_paper.htm#3>>, Dec. 20, 2005, pp. 8.

"International Search Report", Mailed Date: Sep. 12, 2012, Application No. PCT/US2011/066686, Filed Date: Dec. 22, 2011, pp. 9.

"Foreign Office Action", EP Application No. 11850459.6, Feb. 14, 2014, 10 pages.

"Foreign Office Action", CN Application No. 201110436625.9, Apr. 1, 2014, 12 Pages.

"Search Report", EP Application No. 11850459.6, Jan. 17, 2014, 3 pages.

"Foreign Office Action", CN Application No. 201110436625.9, Dec. 23, 2014, 14 Pages.

"Foreign Notice of Allowance", CN Application No. 201110436625.9, Nov. 3, 2015, 4 Pages.

"Foreign Office Action", JP Application No. 2013-546398, Nov. 16, 2015, 8 pages.

"Foreign Office Action", EP Application No. 11850459.6, Apr. 10, 2015, 12 Pages.

"Foreign Office Action", CN Application No. 201110436625.9, Jun. 24, 2015, 7 Pages.

* cited by examiner

DISPLAY REGION REFRESH

BACKGROUND

A portable device, such as a mobile phone or computer device, may utilize a large amount of power to display a high-quality, full color image at sixty (60) frames per second (FPS). For a device that implements field sequential color, power consumption is greater for very high frame rates on the order of three-hundred, fifty (350) FPS to avoid color break-up. The power consumption can be high due to the data source lines and/or the high, twenty volt (20V) level control voltages utilized for display columns, such as to adjust the gray scale levels of each pixel, or sub-pixel, in an electrowetted display panel.

SUMMARY

This summary is provided to introduce simplified concepts of display region refresh that are further described below in the Detailed Description. This summary is not intended to identify essential features of the claimed subject matter, nor is it intended for use in determining the scope of the claimed subject matter.

Display region refresh is described. In embodiments, a display panel has addressable display regions that display at different display refresh rates, such as a first addressable display region and at least a second addressable display region (e.g., to include several addressable display regions). Display data is buffered to update the addressable display regions, and subsequent display data is received to further update the addressable display regions. A display controller can determine display update deltas that indicate pending display updates based on a comparison of the display data to the subsequent display data. A first addressable display region can then be refreshed at display refresh rate based on a first display update delta that corresponds to the first addressable display region, and a second addressable display region can be refreshed at a different display refresh rate based on a second display update delta that corresponds to the second addressable display region.

In other embodiments, the addressable display regions of the display panel are fixed zones, and a first zone is refreshed at the display refresh rate while a second zone is refreshed at a different display refresh rate. Alternatively, the addressable display regions of the display panel are zones that are determined as a factor of a number of pixels of the display panel, and the display controller generates per-zone address signals to refresh the zones at the different display refresh rates. Alternatively or in addition, the addressable display regions of the display panel are individual pixels of the display panel, and the display controller generates per-pixel address signals to refresh the pixels at the different display refresh rates. The display controller can refresh the first addressable display region at a minimum frames per second (FPS), and refresh the second addressable display region at a faster FPS rate, such as a maximum FPS rate. For example, the first addressable display region may be refreshed at a minimum FPS to refresh a static image display, while the second addressable display region is refreshed at a faster FPS rate to refresh a video display.

BRIEF DESCRIPTION OF THE DRAWINGS

Embodiments of display region refresh are described with reference to the following drawings. The same numbers are used throughout the drawings to reference like features and components.

DETAILED DESCRIPTION

Figure 1:
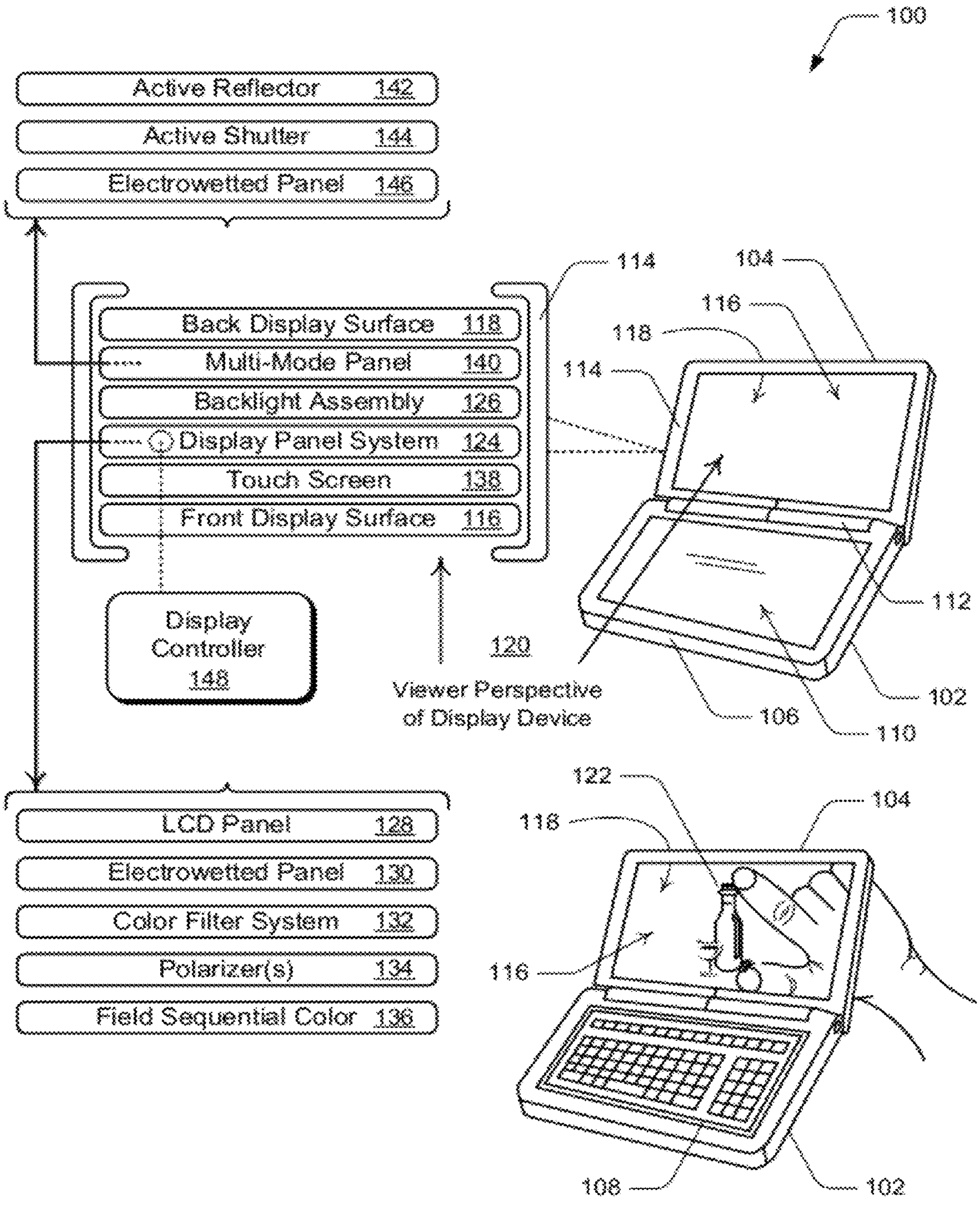
FIG. 1 illustrates examples of a portable device and display assembly in accordance with one or more embodiments of display region refresh.

Embodiments of display region refresh are described. A portable device, such as a mobile phone or computer device, includes a display device that has a display panel, which has addressable display regions that can be controlled to display at different display refresh rates. The addressable display regions of the display panel can be updated at the different display refresh rates based on display update deltas that indicate pending display updates based on a comparison of display data to subsequent display data. For example, display data for a static image in a first display region may not change, or will likely change very little, because the display of the static image does not change. The display data for a video in a second display region, however, will likely continue to change quickly to display the video. The static image can be held for display, and power consumption on a portable device is conserved while a display controller pauses not having to generate and send updates to refresh the display of the static image. Minimizing the amount of voltage switching events per display refresh reduces the overall display power dependency within active matrix displays. Embodiments of display region refresh can be implemented for various types of display panels (e.g., non-transparent, transparent, electrowetted, non-electrowetted, etc.) that can operate at low display refresh rates, and that have a large power draw for pixel updates.

In embodiments, an electrowetted panel can be implemented as the display panel for a portable device. The electrowetted panel can display a first addressable display region at a minimum frames per second (FPS), and also display at least a second addressable display region at a faster FPS rate. In embodiments, a display may include several addressable display regions, and some or all of the addressable display regions can display at different FPS rates. For example, text that does not change or update may be displayed at one (1) Hz, video may be displayed at twenty-four (24) Hz to thirty (30) Hz, and a UI animation may be displayed at sixty (60) Hz. An advantage of utilizing an electrowetting-based display is that the display panel can be refreshed from as low as one (1) Hz to over sixty (60) Hz. The high drive voltage used to operate an electrowetted optical shutter array can be reduced or minimized by reducing the frequency term for power consumption of the electrowetted display. The frequency term is directly related to the frame rate when the entire display is refreshed. Current LCD-based displays are typically driven at frame rates greater than thirty (30) FPS. An electrowetted display, however, can be implemented for a one (1) FPS update rate of display regions that display a static image, or are updated infrequently. The electrowetted display can also update other display regions at sixty (60) FPS, such as for a video display.

While features and concepts of the described systems and methods for display region refresh can be implemented in any number of different environments, systems, devices, and/or various configurations, embodiments of display region refresh are described in the context of the following example devices, systems, and configurations.

FIG. 1 illustrates examples 100 of a portable device 102 in accordance with embodiments of display region refresh. The portable device includes a display device 104 and a handheld base 106 that may include a physical keyboard (shown at 108) or an additional display device 110 as an integrated component of the portable device. The additional display device may be utilized to display text, graphics, images, user interfaces, and/or a virtual keyboard, such as when an implementation of a portable device does not include a physical keyboard. In the examples, the display device 104 is movably coupled at 112 to the handheld base of the portable device, such as with a rotating hinge, slide track, flip mechanism, or other coupling device. The display device can open and close over the handheld base, such as when folded, slid, or flipped closed over the additional display device, folded around to the back of the handheld base, or any position in-between approximately zero degrees (0°) and three-hundred sixty degrees (360°) relative to the handheld base.

The display device 104 includes a display housing 114 that supports various display panels and surfaces that may be utilized to assemble the display device. In this example, the display device includes a front display surface 116, and includes a back display surface 118. The front display surface and the back display surface are viewable from opposite sides of the display device. A user of the portable device 102 may generally view the display device 104 through the front display surface 116, shown for reference as a viewer perspective of the display device at 120.

The display device 104 may be implemented as non-transparent display panel, and both the front and back display surfaces, as well as the additional display device 110, can be implemented for embodiments of display region refresh. Optionally, the display device may also be implemented as a transparent display, in which case a displayed image 122 may be viewable through the front and back display surfaces. As described herein, the transparency of a display device may be a percentage of transparency as measured and/or visually perceived by a user. In the illustrated example, a hand may be viewable through the front and back display surfaces of the display device, such as when viewed through the front of the display device. An environment behind the display device can also be viewable through the front and back display surfaces of the display device, and a displayed image may appear projected into the environment for an augmented view of the environment.

In addition to the front display surface 116 and the back display surface 118, the display device 104 includes a display panel system 124 that is located between the front and back display surfaces. The display panel system is implemented to display images that are then viewable through the front and/or back display surfaces of the display device. The display device includes a backlight assembly 126 that illuminates the display panel for image display. The backlight assembly can include a light source to generate light, a backlight panel or light guide that directs the light to illuminate the display panel, and/or a diffuser that scatters and diffuses the light to uniformly illuminate the display panel.

In various embodiments, the display panel system 124 may include any one or combination of an LCD panel 128, an electrowetted panel 130, a color filter system 132 that may be implemented as a passive or active system, one or more polarizers 134 that may be implemented as passive or active, and/or an implementation of field sequential color 136. The LCD panel may be implemented as a transparent panel, an implementation can include polarizers, and may include an implementation of field sequential color rather than using color filters. The electrowetted panel 130 can be implemented for embodiments of display region refresh. The color filter system 132 and the polarizers 134 can each be implemented for a percentage of transparency that permits an image being viewable through the display device. In embodiments, an implementation of field sequential color 136 may be utilized in place of the color filters.

In this example, the display device also includes a touch screen 138 that is located between the front and back display surfaces to sense a touch input to either of the front display surface or the back display surface. Alternatively, the display device may include a first touch screen located proximate the front display surface and a second touch screen located proximate the back display surface, and the touch screens sense touch inputs to the respective front and back display surfaces.

The display device 104 also includes a multi-mode panel 140 located between the front display surface 116 and the back display surface 118. In embodiments, the multi-mode panel is operable to switch on and off, such as to prevent an image from being viewable through the back display surface, or for transparency to permit the image being viewable through the display device. The multi-mode panel may be implemented to switch on and/or off the entire panel, sections of the panel, and/or individual pixels of the panel. The multi-mode panel may include any one or combination of an active reflector 142, an active shutter 144, and/or an implementation of an electrowetted panel 146 (e.g., implemented as an active reflector).

The active reflector 142 and/or active shutter 144 can be implemented to permit or prevent one side of a display from being viewable, such as through the back display surface 118. The active reflector and the active shutter are operable to switch-on and prevent an image from being viewable through the back display surface, and are further operable to switch-off for transparency to permit the image being viewable through the display device. The active reflector can be implemented as a dual-state mirror having a transparent state for transparency, and a reflective state to reflect and recycle light that is lost, such as from an illuminated light guide that illuminates the display panel. The active shutter can be implemented as an LCD shutter that provides for variable light transmissivity based on an applied voltage.

The display device 104 also includes a display controller 148 that is implemented to control display modes of the display device. The display controller can be implemented as computer-executable instructions, such as a software component, and executed by one or more processors to implement various embodiments for display region refresh. In practice, the portable device 102 is implemented with a processor, a graphics processor unit, and an internal display controller to drive display content to the display device. In the display device 104, the display panel system 124 may include the display controller 148 that drives each pixel according to the type of display at various voltages.

The portable device 102 may be configured as any type of client or user device that includes fixed or mobile, wired and/or wireless devices, and may be implemented as a consumer, computer (e.g., a laptop or tablet device), portable, communication, phone (e.g., a dual-display phone), appliance, gaming, media playback, and/or electronic device. The portable device can be implemented with one or more processors, data communication components, memory components, navigation components, data processing and control circuits, and a display system. Further, any of the portable devices described herein can be implemented with any number and combination of differing components as further described with reference to the example device shown in FIG. 5.

Figure 2:
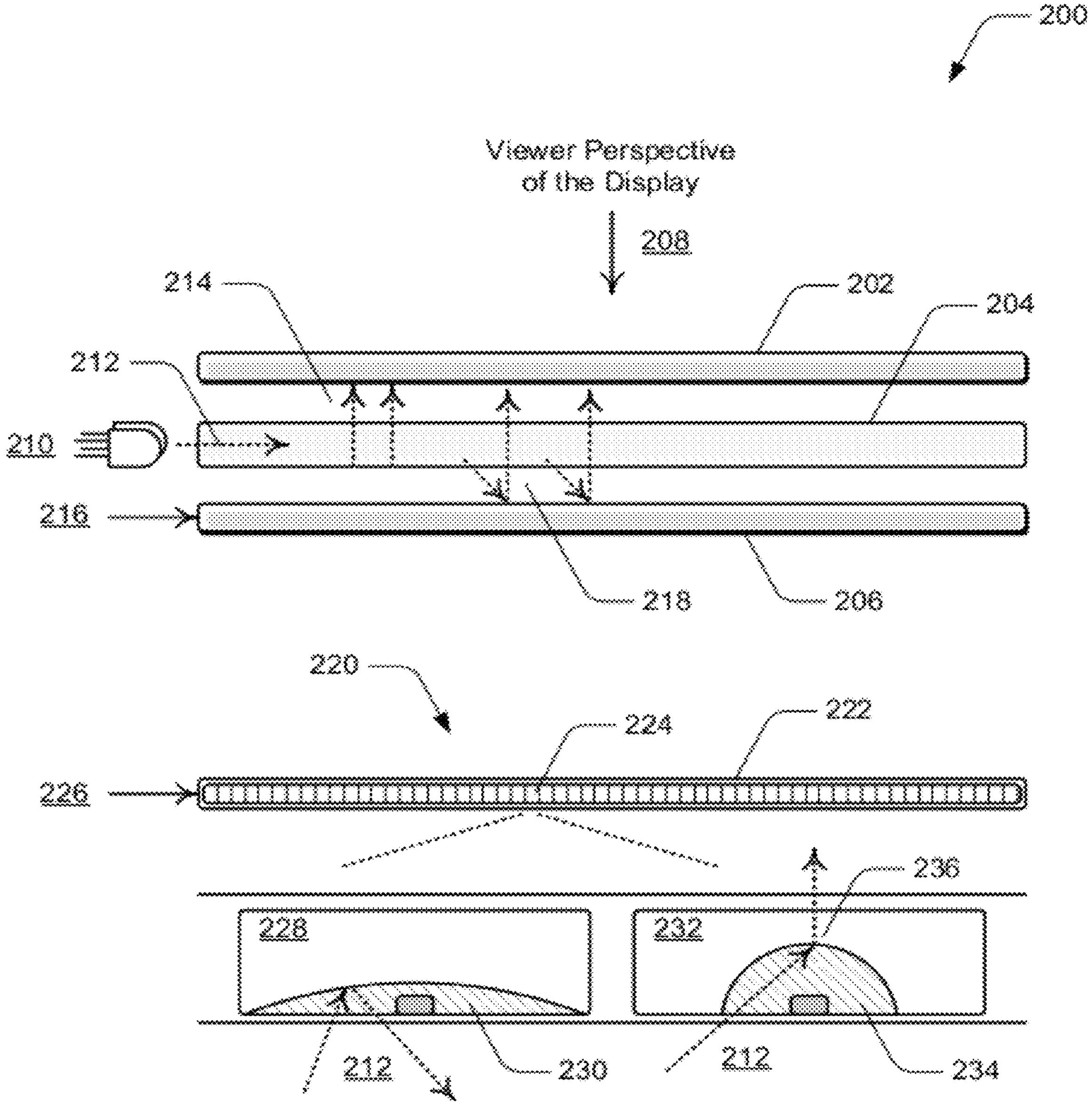
FIG. 2 illustrates examples of display components in accordance with one or more embodiments of display region refresh.

FIG. 2 illustrates examples 200 of display components in embodiments of display region refresh. The display components include a display panel 202, such as described with reference to the display panel system, as well as a light guide 204 and a multi-mode panel 206 as described with reference to the display device shown in FIG. 1. An orientation reference at 208 indicates a viewer perspective of the display panel, such as when a user of a device that includes the display components views the display panel. The display components also include a light source 210 that can be implemented as a white light, or as separate RGB colors, which may be utilized for color imaging using field sequential color averaging. The light source generates light 212 and the light guide directs the light to illuminate the display panel at 214. The multi-mode panel 206 can be activated with an activation control input 216. When switched-on and operable as a reflector, for example, lost light that is generated by the light source and directed away from the display panel is reflected at 218 to further illuminate the display panel 202.

A detail view 220 illustrates an electrowetted panel 222 that can be implemented as the display panel 202 in embodiments of display region refresh. The electrowetted panel 222 includes electrowetted cells 224 that are each a pixel of the display panel. Each of the electrowetted cells can be individually controlled with activation control inputs 226 that are initiated from the display controller. The detail view 220 also illustrates an example of an individual electrowetted cell 228 when an electrowetted cell liquid 230 is activated for distribution across the electrowetted cell. The electrowetted cell liquid is approximately flat when distributed across the electrowetted cell and acts to reflect the light 212, giving the appearance of a pixel that is not illuminated in the display panel. The electrowetted cell liquid can be implemented as a reflective oil, water, colored liquid, or other liquid material.

Another example of an individual electrowetted cell 232 is shown operable to emit the light 212 when the electrowetted cell liquid 234 forms a light extraction feature caused by surface tension in the electrowetted cell. In this example, the electrowetted cell liquid forms as a bead (e.g., the light extraction feature) when the electrowetted cell is not activated. A refraction angle at 236 of the reflected light changes with the shape of the bead that is created in the electrowetted cell, which allows the light to emit from the electrowetted cell giving the appearance of a pixel that is illuminated for display in the display panel.

Figure 3:
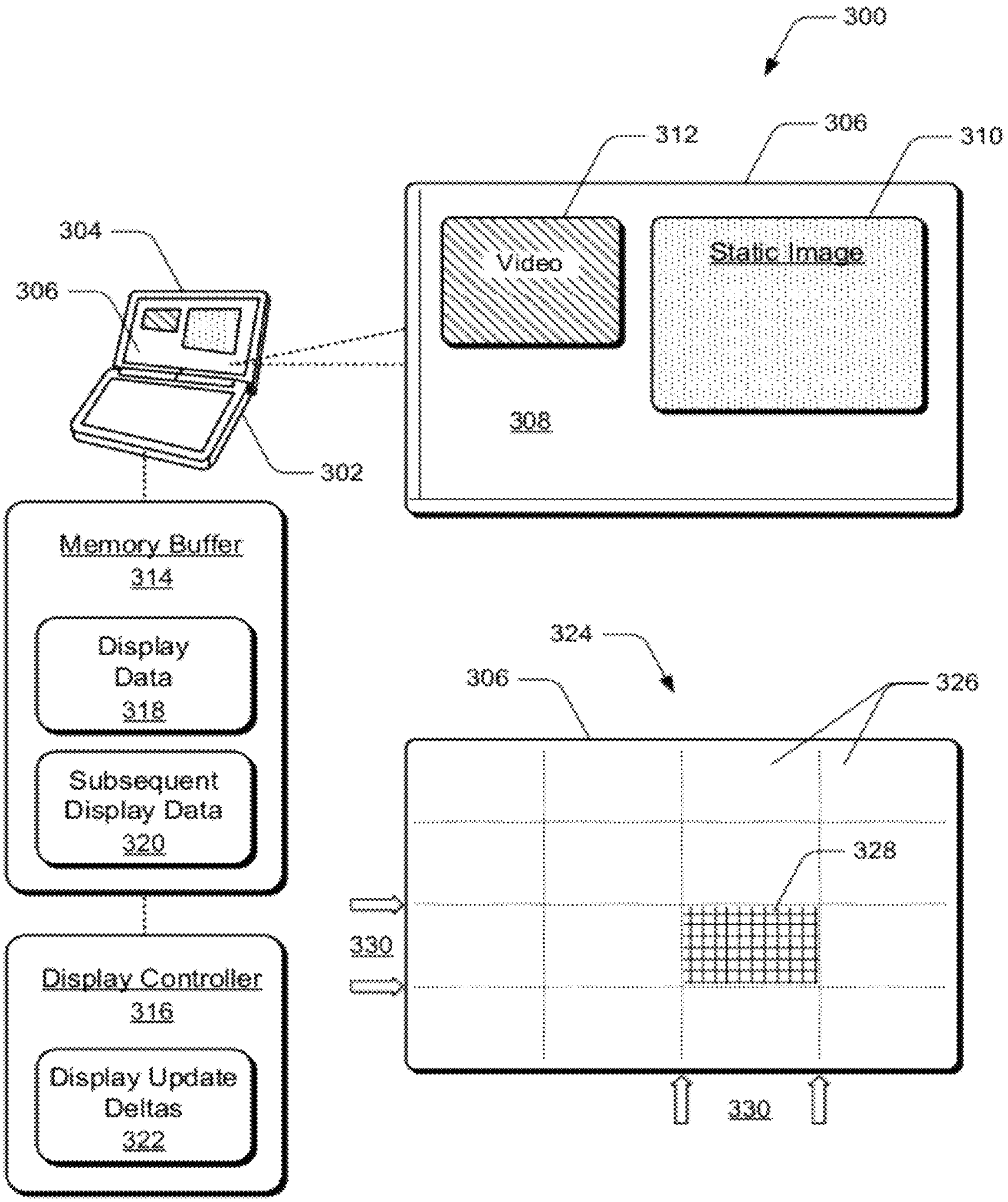
FIG. 3 illustrates examples of display panels and display region refresh in accordance with one or more embodiments.

FIG. 3 illustrates examples 300 of display panels in embodiments of display region refresh, such as described with reference to the display panels shown in FIGS. 1 and 2. A portable device 302 includes a display device 304 with a display panel 306 that has addressable display regions configured to display at different display refresh rates. For example, the display panel 306 can display a user interface 308 in which a first addressable display region 310 of the display panel displays a static image, such as an article of text that is displayed for a viewer to read. The static image can be held for display, and power consumption on the portable device is conserved while the display controller pauses not having to generate and send updates to refresh the first addressable display region.

The display panel 306 can also include a second addressable display region 312 that displays video. In embodiments, the first display region 310 may be refreshed at a minimum frames per second (FPS), such as at one (1) FPS for an implementation of an electrowetted panel to display the static image, and the second display region 312 may be refreshed at a faster, or maximum, FPS to display the video, such as at sixty (60) FPS. Although examples of display region refresh are described herein with reference to first and second display regions, a display may include several addressable display regions, and some or all of the addressable display regions can display at different FPS rates. For example, text that does not change or update may be displayed at one (1) Hz, video may be displayed at twenty-four (24) Hz to thirty (30) Hz, and a UI animation may be displayed at sixty (60) Hz.

In these examples, the portable device 302 includes a memory buffer 314 and a display controller 316, such as described with reference to FIG. 1. The memory buffer is implemented to buffer display data 318 to update the addressable display regions of the display panel 306, such as the first display region 310 and the second display region 312. The memory buffer 314 also receives subsequent display data 320 to further update the addressable display regions, such as when display data is sequentially received to refresh the display.

The data that corresponds to the static image in the first display region 310 may not change, or will likely change very little, from the display data 318 to the subsequent display data 320 because the static image does not change on the user interface. The data that corresponds to the video in the second display region 312, however, will likely continue to change quickly from the display data to the subsequent display data to display the video. The display controller 316 can determine the display update deltas 322 that indicate pending display updates based on a comparison of the display data to the subsequent display data for each of the addressable display regions. In this example, the display controller can then refresh the first addressable display region at a display refresh rate based on a display update delta that corresponds to the rate of data change for the static image. The display controller can also refresh the second addressable display region at a different display refresh rate based on a display update delta that corresponds to the rate of data change for the video. In embodiments, a video region, such as the second display region 312, may also include a static section within the video region, and the static section within the video region can be refreshed or updated at a different refresh rate.

An additional view 324 illustrates that addressable display regions of the display panel 306 can be implemented as fixed zones or regions 326 of the display panel. The display controller 316 is then implemented to refresh a first zone at a display refresh rate, and refresh at least a second zone at a different display refresh rate. Alternatively or in addition, the addressable display regions of the display panel can be implemented as the individual pixels 328 of the display panel, and the display controller is implemented to generate per-pixel address signals 330 to refresh the individual pixels at the different display refresh rates. Alternatively or in addition, the addressable display regions of the display panel are zones that are determined as a factor of a number of pixels of the display panel. For example, an 800×480 display panel may have 16×8 zones, and the display controller is implemented to generate the per-zone address signals to refresh the different zones at the different display refresh rates. In implementations other than simple token shifting, pixel rows within zones can be skipped when values have not changed within them. The display controller may also implement logic to sequentially pass a token from one display region to the next (e.g., zones, pixels, or other defined zones).

Example method 400 is described with reference to FIG. 4 in accordance with one or more embodiments of display region refresh. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
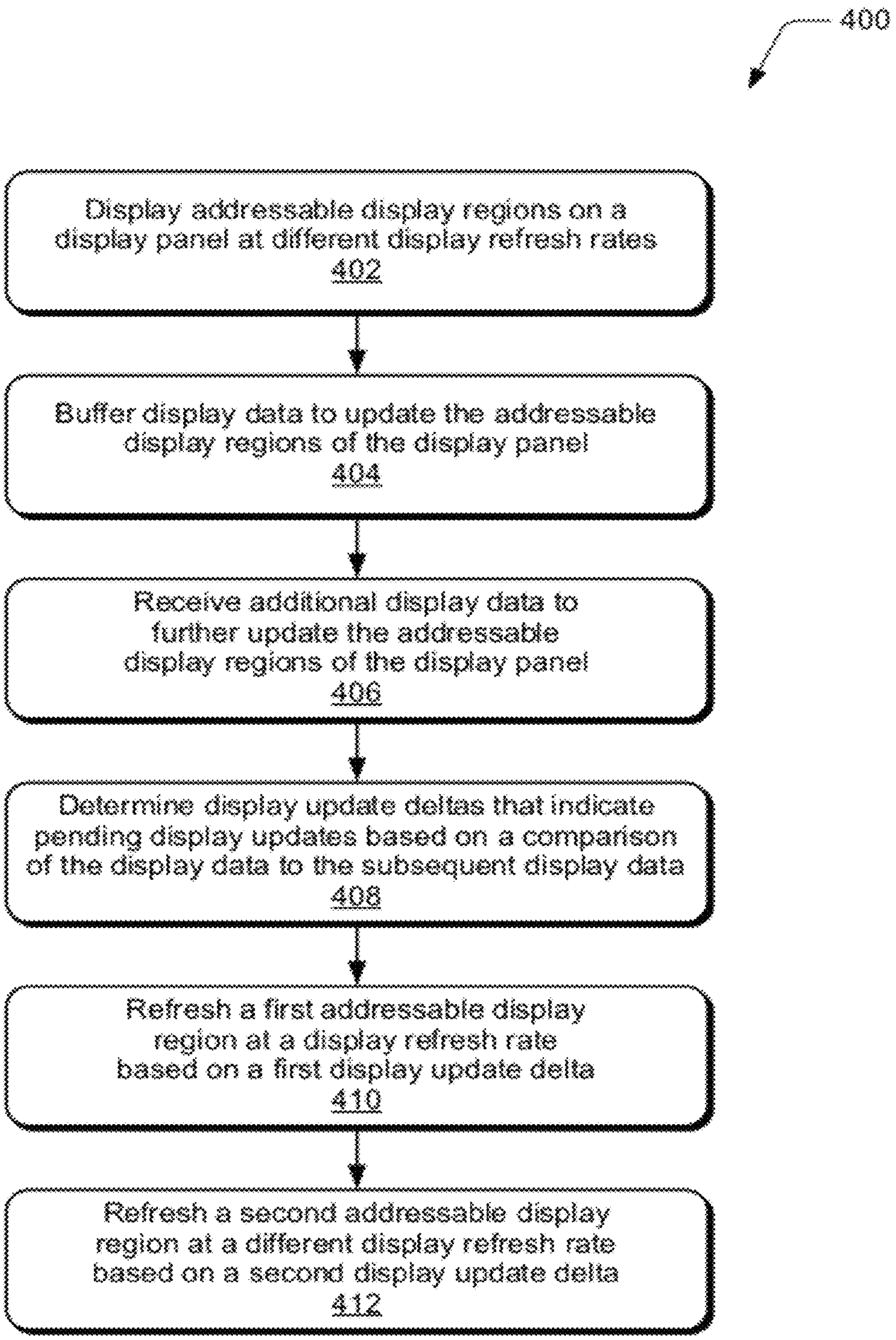
FIG. 4 illustrates example method(s) of display region refresh in accordance with one or more embodiments.

FIG. 4 illustrates example method(s) 400 of display region refresh. The order in which the method blocks are described are not intended to be construed as a limitation, and any number of the described method blocks can be combined in any order to implement a method, or an alternate method.

At block 402, addressable display regions are displayed on a display panel at different display refresh rates. For example, the display panel 306 (FIG. 3) includes a first addressable display region 310 that displays a static image, and a second addressable display region 312 that displays video. The addressable display regions display at different display refresh rates. For example, the first display region 310 may be refreshed at a minimum frames per second (FPS) to display the static image, and the second display region 312 may be refreshed at a faster, or maximum, FPS to display the video. In embodiments, the addressable display regions may be fixed zones of the display panel, zones of the display panel that are determined as a factor of a number of pixels of the display panel, and/or individual pixels of the display panel.

At block 404, display data is buffered to update the addressable display regions of the display panel and, at block 406, subsequent display data is received to further update the addressable display regions of the display panel. For example, the memory buffer 314 buffers the display data 318 to update the addressable display regions of the display panel 306, and the memory buffer receives subsequent display data 320 to further update the addressable display regions, such as when display data is sequentially received to refresh the display.

At block 408, display update deltas are determined that indicate pending display updates based on a comparison of the display data to the subsequent display data. For example, the display controller 316 determines the display update deltas 322 that indicate pending display updates based on a comparison of the display data to the subsequent display data for each of the addressable display regions. The data that corresponds to the static image in the first display region 310 may not change, or will likely change very little, from the display data 318 to the subsequent display data 320 because the static image does not change. The data that corresponds to the video in the second display region 312, however, will likely continue to change quickly from the display data to the subsequent display data to display the video.

At block 410, a first addressable display region is refreshed at a display refresh rate based on a first display update delta that corresponds to the first addressable display region. For example, the display controller 316 refreshes the first addressable display region 310 at a display refresh rate based on a display update delta that corresponds to the rate of data change for the static image. In an embodiment, the first addressable display region can be refreshed at a minimum frames per second (FPS), such as to refresh the static image display.

At block 412, at least a second addressable display region is refreshed at a different display refresh rate based on a second display update delta that corresponds to the second addressable display region. For example, the display controller 316 also refreshes the second addressable display region 312 at a different display refresh rate based on a display update delta that corresponds to the rate of data change for the video. In an embodiment, the second addressable display region is refreshed at a faster FPS rate than the first addressable display region, such as to refresh the video display. Similarly, a first zone of the display panel can be refreshed at the display refresh rate and a second zone of the display panel can be refreshed at the different display refresh rate. In other embodiments, the display controller generates per-zone address signals to refresh the zones of the display panel at the different display refresh rates, such as when the zones are a factor of a number of pixels of the display panel. Alternatively, the display controller generates the per-pixel address signals to refresh the individual pixels of the display panel at the different display refresh rates, such as when the addressable display regions are the individual pixels of the display panel.

Figure 5:
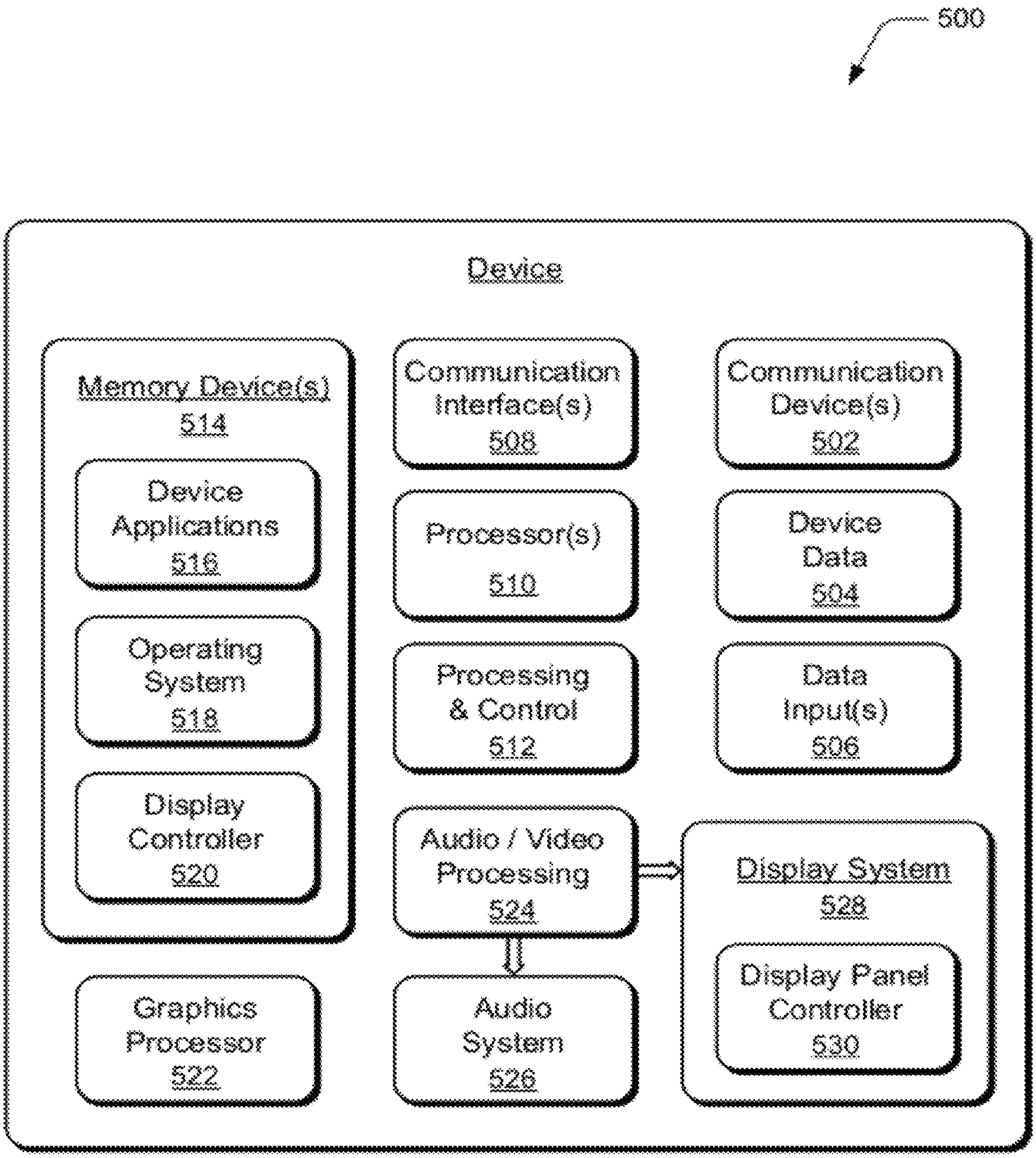
FIG. 5 illustrates various components of an example device that can implement embodiments of display region refresh.

FIG. 5 illustrates various components of an example device 500 that can be implemented as a portable device as described with reference to any of the previous FIGS. 1-4. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for transmission, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs, messages, communications, music, television content, recorded video content, and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 and a display controller 520 can be maintained as software applications with a memory device and executed on the processors. The device applications may also include a device manager, such as any form of a control application, software application, signal processing and control module, code that is native to a particular device, a hardware abstraction layer for a particular device, and so on.

The device 500 may also include a graphics processor 522, and includes an audio and/or video processing system 524 that generates audio data for an audio system 526 and/or generates display data for a display system 528. The audio system and/or the display system may include any devices that process, display, and/or otherwise render audio, video, display, and/or image data. For example, the display system includes a display panel controller 530. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of display region refresh have been described in language specific to features and/or methods, the subject of the appended claims is not necessarily limited to the specific features or methods described. Rather, the specific features and methods are disclosed as example implementations of display region refresh.

The invention claimed is:

1. A device, comprising:

a single electrowetted display panel located between a front surface and a back surface of the device, the single electrowetted display panel having multiple addressable display regions, the multiple addressable display regions configured to display at different display refresh rates simultaneously on the single electrowetted display panel;

a multi-mode panel located between the front surface and the back surface of the device, the multi-mode panel operable to switch on to prevent visibility through the front surface and the back surface of the device, the multi-mode panel further operable to switch off to permit transparency to view through the front surface, the electrowetted display panel, and the back surface of the device;

a buffer configured to buffer display data to update the addressable display regions, the buffer further configured to receive subsequent display data to further update the addressable display regions;

a memory and a processor to implement a display controller configured to:

determine display update deltas configured to indicate pending display updates based on a comparison of the display data to the subsequent display data;

refresh a first addressable display region displayed on the single electrowetted display panel comprising a static image at a minimum frames per second (FPS) display refresh rate of 1 Hz based on a first display update delta that corresponds to the first addressable display region; and refresh at least a second addressable display region displayed on the single electrowetted display panel comprising a video display at a faster FPS display refresh rate based on a second display update delta that corresponds to the second addressable display region, the static image and the video displayed simultaneously on the single electrowetted display panel as the static image and the video are refreshed, respectively.

2. A device as recited in claim 1, wherein the addressable display regions comprise fixed zones of the electrowetted display panel, and wherein the display controller is further configured to refresh a first zone at the display refresh rate and refresh a second zone at the different display refresh rate.

3. A device as recited in claim 1, wherein the addressable display regions comprise zones of the electrowetted display panel that are determined as a factor of a number of pixels of the display panel, and wherein the display controller is further configured to generate per-zone address signals to refresh the zones at the different display refresh rates.

4. A device as recited in claim 1, wherein the display controller is configured to generate per-pixel address signals to refresh the individual pixels at the different display refresh rates.

5. A device as recited in claim 1, wherein the display controller is further configured to refresh the second addressable display region at an FPS rate within a range of 24 to 60 Hz.

6. A device as recited in claim 1, wherein the electrowetted display panel is configured to display the first addressable display region at the minimum FPS, and is further configured to display the second addressable display region at the faster FPS rate.

7. A display system, comprising:

a single display panel having multiple addressable display regions comprising zones of the display panel that are determined as a factor of the number of pixels of the display panel, the addressable display regions configured to display at different display refresh rates simultaneously on the single display panel, the addressable display regions further comprising one content type and at least one other content type to be displayed simultaneously on the single display panel;

a front display surface of the display system and a back display surface of the display system that are viewable from opposite sides of the single display panel of the display system and configured to display the multiple addressable display regions on both the front display surface and the back display surface, the single display panel located between the front display surface and the back display surface;

buffered display data to update the addressable display regions, and subsequent display data to further update the addressable display regions; and display update deltas corresponding to each of the respective content types to be displayed simultaneously on the single display panel that indicate pending display updates based on a comparison of the display data to the subsequent display data, a first pending display update corresponding to a first addressable display region that refreshes at a frames per second (FPS) display refresh rate of 1 Hz, and a second pending display update corresponding to at least a second addressable display region that refreshes at a different display refresh rate.

8. A display system as recited in claim 7, wherein the addressable display regions comprise fixed zones of the display panel, and wherein a first zone is refreshed at the display refresh rate and a second zone is refreshed at the different display refresh rate.

9. A display system as recited in claim 7, wherein per-zone address signals are generated to refresh the zones at the different display refresh rates.

10. A display system as recited in claim 7, wherein per-pixel address signals are generated to refresh individual pixels at the different display refresh rates.

11. A display system as recited in claim 7, wherein the second addressable display region refreshes at a faster FPS rate than the first addressable display region.

12. A display system as recited in claim 7, wherein the first addressable display region refreshes a static image display, and the second addressable display region refreshes at a faster FPS rate to refresh a video display.

13. A display system as recited in claim 7, wherein the display panel is an electrowetted panel configured to display the first addressable display region at the FPS display refresh rate of 1 Hz, and is further configured to display the second addressable display region at a faster FPS rate.

14. A method, comprising:

displaying addressable display regions on a single display panel having multiple addressable display regions, the single display panel located between a front display surface of a transparent display and a back display surface of a transparent display, the multiple addressable display regions comprising individual pixels of a display panel displaying at different display refresh rates simultaneously on the single display panel, the addressable display regions further comprising one content type and at least one other content type to be displayed simultaneously on the single display panel, the display panel configured as part of the transparent display wherein the addressable display regions are viewable through the front and back display surfaces;

buffering display data to update the addressable display regions;

determining display update deltas corresponding to each of the respective content types to be displayed simultaneously on the single display panel that indicate pending display updates based on a comparison of the display data to subsequent display data that further updates the addressable display regions;

refreshing a first addressable display region at a frames per second (FPS) display refresh rate of 1 Hz based on a first display update delta that corresponds to the first addressable display region; and refreshing at least a second addressable display region at a different display refresh rate based on a second display update delta that corresponds to the second addressable display region.

15. A method as recited in claim 14, wherein the addressable display regions comprise fixed zones of the display panel, the method further comprising refreshing a first zone at the display refresh rate and refreshing a second zone at the different display refresh rate.

16. A method as recited in claim 14, wherein the addressable display regions comprise zones of the display panel that are determined as a factor of a number of pixels of the display panel, the method further comprising generating per-zone address signals to refresh the zones at the different display refresh rates.

17. A method as recited in claim 14, further comprising generating per-pixel address signals to refresh the individual pixels at the different display refresh rates.

18. A method as recited in claim 14, further comprising refreshing the second addressable display region at a faster FPS rate than the first addressable display region.

19. A method as recited in claim 14, further comprising:

refreshing the first addressable display region to refresh a static image display; and refreshing the second addressable display region at a faster FPS rate to refresh a video display.

20. A method as recited in claim 14, further comprising: refreshing the second addressable display region at an FPS rate within a range of 24 to 60 Hz.

* * * * *